April 15, 1941.  N. ERLAND AF KLEEN  2,238,043

THERMOSTATIC CONTROLLING DEVICE

Original Filed Jan. 20, 1938

INVENTOR
NILS ERLAND af KLEEN
BY *Norris & Bateman*
ATTORNEYS

Patented Apr. 15, 1941

2,238,043

UNITED STATES PATENT OFFICE 2,238,043

THERMOSTATIC CONTROLLING DEVICE

Nils Erland af Kleen, Stockholm, Sweden

Original application January 20, 1938, Serial No. 185,978. Divided and this application October 16, 1939, Serial No. 299,774. In Great Britain January 22, 1937

1 Claim. (Cl. 74—100)

This invention relates to a snap action thermostatic controlling device more particularly intended for controlling the operation of refrigerating systems of the kind employing one or more intermittently operating units, each unit comprising a generator-absorber, a condenser and an evaporator.

In the operation of systems of this kind, it is necessary to operate a heat-controlling switch at a definite point in the cycle of operations and for this purpose a thermostatic controlling device is required which will operate suddenly at a predetermined temperature level. As the temperature in the boiler-absorber rises and falls regularly and the temperature range is considerable a considerable amount of energy is available to a thermostatic device having a bulb located in the boiler-absorber.

This application is a division of my application Serial No. 185,978, filed Jan. 20, 1938.

The object of the present invention is to provide an improved thermostatic device capable of making use of substantially the whole of the energy available as aforesaid for effecting the required switching operation suddenly when a predetermined level of temperature has been reached.

The invention consists in a snap action thermostatic controlling device comprising a movable part, a temperature responsive expansible part, a spring for transmitting the movement of said expansible part to said movable part, a detent for holding said movable part and means operative by said expansible part to actuate said detent to release said movable part at a predetermined temperature.

Figure 1:
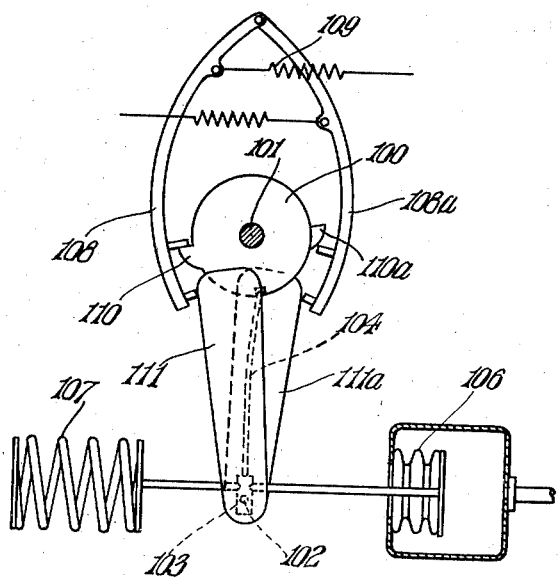
Figure 2:
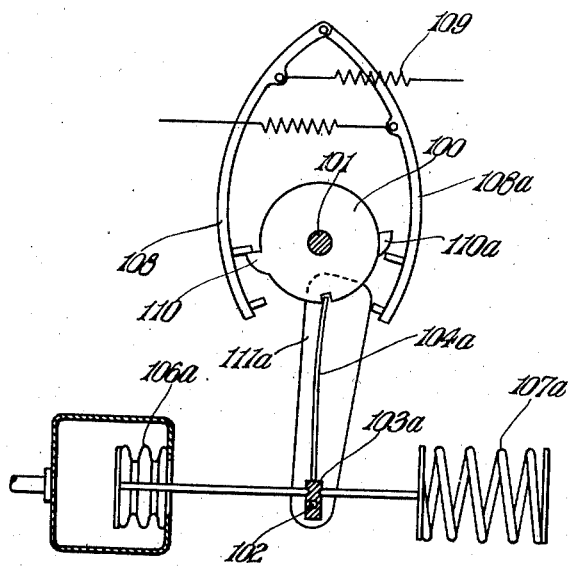

The invention will now be described with reference to the accompanying drawing in which Figures 1 and 2 are diagrammatic illustrations of a snap action mechanism for the thermostatic control.

The mechanism comprises an actuating spring 104 adapted to be gradually loaded by the action of a bellows device 106 and a detent 108 adapted to release the spring so as to bring about a sudden actuation of the switching mechanism when the temperature of the thermostat reaches a predetermined value.

The spring 104 takes the form of a springy plate fixed at one end to a block 103 mounted so that it is free to rotate on a spindle 102 mounted on suitable fixed supports. The bellows 106 tends to rock the block 103 and plate 104 to the left as seen in the drawing and a control spring 107 is arranged to act in opposition to the bellows.

The upper end of the springy plate 104 engages in a recess formed in a drum 100 fixed to a rockshaft 101 supported in suitable bearings (not shown) fixed above the spindle 102, the arrangement being such that the pressure of the bellows 106 acting through the plate 104 tends to rotate the drum 100 in the clockwise direction as seen in Figure 6.

The detent 108, which is controlled by a spring 109, is arranged to engage a ratchet tooth or like projection 110 on the drum 100 so as to hold the drum against rotation in the clockwise direction. A rigid lever 111 fixed to the block 103 is arranged to engage and move the detent 108 so as to disengage the same from the tooth 110 when the temperature of the thermostat connected to the bellows 106 reaches a predetermined limit. As the bellows 106 expands with rising temperature, the springy plate 104 is gradually loaded. At the same time the detent 108 is gradually displaced by the action of the lever 111. When the set temperature is reached, the detent 108 clears the tooth 110 and the drum 100 and rock shaft 101 then receive a sudden partial rotation in the clockwise direction under the action of the spring 104.

A detent 108a similar to the detent 108 is arranged to lock the drum 100 in its new position by engagement with a tooth 110a similar to the tooth 110, and a lever 111a is provided for the purpose of disengaging the detent and thereby permitting the drum 100 to be restored to its first position at the appropriate time.

In the case of a single unit refrigerating system where only one thermostat is required, the lever 111a may be fixed to the block 103. In such case, as the bellows 106 contracts with falling temperature the pressure of the control spring 107 will tend to impart anti-clockwise rotation to the drum 100 through the medium of the plate 104. As the temperature continues to fall, the springy plate 104 is gradually loaded and the detent 108a is gradually displaced. At a predetermined temperature, the detent 108a clears the tooth 110a and the drum 100 and shaft 101 are then suddenly restored to the position shown in the drawing under the action of the springy plate 104.

In the case of a two-unit refrigerating system in which two thermostats are employed, one of the thermostats is connected to the bellows 106 and the other is connected to a second bellows 106a (see Figure 2). A separate block 103a, spring plate 104a and control spring 107a are provided in connection with the bellows 106a, these parts being similar to the parts 103, 104 and 107 previously described, but being arranged to work in the opposite direction so that the expansion of the bellows 106a tends to rotate the drum 100 in the anti-clockwise direction. In this case, the lever 111a is fixed to the block 103a so that the release of the detent 108a will be effected by the expansion of the bellows 106a and will occur when the temperature of the thermostat connected to the bellows 106a reaches a preset limit. In Figure 7 of the drawing, the parts 106, 107, 103 and 111 are omitted in order to permit the parts 103a and 104a to be seen.

It will be appreciated that the movements of the rock shaft 101 can be utilized for actuating a rock burner for delivering a heat supply to either of two boiler-absorbers or for operating any gas valve mechanism or electrical switch mechanism for effecting the required change over.

I claim:

A thermostat snap-switch device of the class described, comprising a rocking member shiftable between two operating positions, movable latch means adjacent each side of said member and cooperating therewith to hold said member in each of its operating positions, rockable means, leaf spring means secured at one end to said rockable means and operatively connected at the other end to said rocking member for moving the latter alternately to its two operating positions, temperature-responsive elements movable from retracted positions to extended positions for rocking said rockable means alternately in opposite directions to correspondingly load said spring means, and separate means on said rockable means operable by said temperature-responsive elements and cooperating with said latch means to release the latter when the respective temperature-responsive element reaches its extended position, whereby said leaf spring means quickly shifts said rocking member from one operating position to the other.

NILS ERLAND AF KLEEN.